US008338740B2

(12) United States Patent
Liebold et al.

(10) Patent No.: US 8,338,740 B2
(45) Date of Patent: Dec. 25, 2012

(54) NOZZLE WITH EXPOSED VENT PASSAGE

(75) Inventors: Stephen M. Liebold, Grantham, NH (US); Brian J. Currier, Newport, NH (US)

(73) Assignee: Hypertherm, Inc., Hanover, NH (US)

( * ) Notice: Subject to any disclaimer, the term of this patent is extended or adjusted under 35 U.S.C. 154(b) by 1121 days.

(21) Appl. No.: 12/241,922

(22) Filed: Sep. 30, 2008

(65) Prior Publication Data

US 2010/0078408 A1 Apr. 1, 2010

(51) Int. Cl.
*B23K 10/00* (2006.01)

(52) U.S. Cl. ........... 219/121.5; 219/121.51; 219/121.52; 219/75; 315/111.21

(58) Field of Classification Search ............. 219/121.39, 219/121.48, 121.51, 121.5, 121.59, 121.52, 219/74, 75, 121.55; 313/321.41, 231.51
See application file for complete search history.

(56) References Cited

U.S. PATENT DOCUMENTS

| | | | | |
|---|---|---|---|---|
| 3,641,308 | A | 2/1972 | Couch et al. | |
| 3,770,935 | A | 11/1973 | Tateno et al. | |
| 4,163,891 | A | 8/1979 | Komatsu et al. | |
| 4,361,748 | A | 11/1982 | Couch | |
| 4,382,170 | A | 5/1983 | Klingel | |
| 4,521,666 | A | 6/1985 | Severance, Jr. et al. | |
| 4,558,201 | A | 12/1985 | Hatch | |
| 4,625,094 | A | 11/1986 | Marhic et al. | |
| 4,743,734 | A | 5/1988 | Garlnov et al. | |
| 4,777,343 | A | 10/1988 | Goodwin | |
| 4,861,962 | A | 8/1989 | Sanders et al. | |
| 4,902,871 | A * | 2/1990 | Sanders et al. | 219/121.49 |
| 5,017,752 | A | 5/1991 | Severance, Jr. et al. | |
| 5,317,126 | A | 5/1994 | Couch et al. | |
| 5,841,095 | A * | 11/1998 | Lu et al. | 219/121.48 |
| 6,130,399 | A | 10/2000 | Lu et al. | |
| 6,207,923 | B1 * | 3/2001 | Lindsay | 219/121.5 |
| 6,337,460 | B2 * | 1/2002 | Kelkar et al. | 219/121.5 |
| 2006/0289396 | A1 | 12/2006 | Duan | |

FOREIGN PATENT DOCUMENTS

JP S63-30180 2/1988

(Continued)

OTHER PUBLICATIONS

The International Search Report and the Written Opinion of the International Searching Authority for International Patent Application No. PCT/US2009/048590, date of mailing Dec. 1, 2009 (15 pages).
Hypertherm HT4400 Brochure Rev. 0, Mar. 2006 (4 pgs).
Hypertherm HyPerformance Plasma Brochure Rev. 2, Feb. 2008. (4 pgs).

*Primary Examiner* — Mark Paschall
(74) *Attorney, Agent, or Firm* — Proskauer Rose LLP

(57) ABSTRACT

A nozzle for a plasma torch can include a body that has an inner surface, an outer surface, a proximal end, and an exit orifice at a distal end. The nozzle can also include a liner surrounded by the inner surface of the body. The liner can include a proximal end and an exit orifice at a distal end adjacent the exit orifice of the body. The nozzle can include at least one vent passage formed in the body. The vent passage can have an inlet formed in the inner surface of the body and an outlet formed in the outer surface of the body. The vent passage can be disposed between the proximal end of the body and the proximal end of the liner. The plasma arc torch can include a configuration that allows for increased electrode life and nozzle life for a vented high current plasma process.

31 Claims, 7 Drawing Sheets

FOREIGN PATENT DOCUMENTS

| | | |
|---|---|---|
| SU | 1234104 | 5/1986 |
| WO | WO 88/01126 | 2/1988 |
| WO | WO 98/19504 | 5/1998 |
| WO | WO 2006/113737 | 10/2006 |

* cited by examiner

NOZZLE WITH EXPOSED VENT PASSAGE

FIELD OF THE INVENTION

The invention relates in general to the field of plasma arc cutting torches and their method of operation. More specifically, the invention relates to an improved nozzle and related methods of operation.

BACKGROUND OF THE INVENTION

In a high current oxygen torch, electrode and nozzle life can be very short as compared with lower current processes. Nozzle life in a high current oxygen torch can be short due to the excessive heat load imparted to the nozzle tip. One method of reducing the heat load on a nozzle and increasing nozzle life is by venting a portion of plasma gas from before the nozzle bore. See, e.g., U.S. Pat. No. 5,317,126 entitled "Nozzle and Method of Operation for a Plasma Arc Torch" filed on Jan. 14, 1992, the contents of which are incorporated by reference in their entirety. Venting further helps constrict the arc by pinching the arc and cooling the nozzle. Vented plasma processes can achieve a more highly constricted arc, which can improve cut performance while extending nozzle life. Cooling a nozzle wall at the nozzle exit orifice can produce a thin boundary layer of cooled gas, which can protect the nozzle and pinch the arc (e.g., cause the arc to contract by this energy drain from its boundary). Cooling can also aid in controlling double arcing and gouging of the nozzle orifice (i.e. when the arc contacts the wall.)

Electrode life can be extended by improved cooling of the hafnium emitter, e.g., using Hypertherm's Cool Core design. See, e.g., U.S. Pat. No. 6,130,399 entitled "Electrode for a Plasma Arc Torch Having an Improved Insert Configuration" filed on Jul. 20, 1998, the contents of which are incorporated by reference in their entirety). However, electrode life can still be short, especially when the plasma gas swirl injection point is far upstream from the electrode face (e.g., due to a large plasma plenum). Electrode life can be improved as the swirl injection location is moved closer to the electrode face. A plasma arc torch can have a swirl injection point that is close to an electrode face (e.g., resulting in a reduced plenum). For example, the HT4400 400A O2 plasma process has a swirl ring design has a "closer" swirl injection location. Moving the swirl injection location closer to the electrode face can enhance electrode life in a high current torch because it reduces the amount of emitter wear during operation of the torch. A long swirl ring can be used to accomplish a swirl injection point close to the electrode face, extending electrode life.

SUMMARY OF THE INVENTION

Utilizing a prior art vented nozzle (e.g., such as the nozzle in U.S. Pat. No. 5,317,126) can limit the available space for a swirl ring due to the liner of the nozzle. While the prior art vented nozzle enhances nozzle life, the prior art vented nozzle causes the swirl ring injection point to be disposed far from the electrode face (e.g., a long distance between the swirl ring injection point and the electrode face), resulting in a poor electrode life.

Configuring a swirl ring injection point to be close to the electrode face while simultaneously cooling the nozzle with a vented gas can enhance both nozzle life and electrode life. In some aspects, the invention can feature a nozzle shell/body that can be dimensioned to receive both a nozzle liner and at least a portion of a swirl ring. The nozzle can be configured to allow the swirl ring to be inserted deep into the nozzle, permitting a swirl ring injection point to be close to the electrode while still accommodating for the use of a vented nozzle. Plasma gas can be injected towards an end face of the electrode, reducing the amount of emitter wear during operation of the torch (e.g., resulting in improved swirl control of the gas flow thereby reducing molten hafnium emission/ejection during electrode operation). A vented nozzle can include a plasma gas vent passage formed in the nozzle. In some aspects, the invention can feature a vented nozzle where the distance of the vent passage from the orifice can be located far enough to prevent molten metal from being introduced into the vent passage, which can cause damage to the torch. Consumables that are elongate and tapered (i.e., "pointy") can make the consumables useful for beveling.

In one aspect, the invention features a nozzle for a plasma torch that can include a body having an inner surface, an outer surface, a proximal end, and an exit orifice at a distal end. The nozzle can include a liner surrounded by the inner surface of the body that includes a proximal end and an exit orifice at a distal end adjacent the exit orifice of the body. The nozzle can also include at least one vent passage formed in the body. The at least one vent passage can include an inlet formed in the inner surface of the body and an outlet formed in the outer surface of the body. The at least one vent passage can be disposed between the proximal end of the body and the proximal end of the liner.

In another aspect, the invention features a nozzle for a plasma torch that can include a body having an interior surface, an exterior surface, and a void defined by the interior surface of the body. The nozzle can include a liner completely disposed within a first portion of the void and adjacent the interior surface of the body. The nozzle can also include at least one plasma gas vent hole extending from the interior surface of the body to the exterior surface of the body. The at least one plasma gas vent hole can be directly exposed to a second portion of the void.

In yet another aspect, the invention features a nozzle for a plasma torch. The nozzle can include a body having a proximal end, a distal end and an exit orifice disposed at the distal end. The nozzle can also include a liner having a proximal end, a distal end and an exit orifice disposed at the distal end of the liner and adjacent the exit orifice of the body. The nozzle can also include a plasma gas vent channel defined at least in part by a portion of the body and the liner. At least one plasma gas vent hole can be formed in the body. The nozzle can also include a cavity having a first end corresponding to the proximal end of the body and a second end corresponding to a feature of the liner. The length of the first end of the cavity to the second end of the cavity can be at least ⅓ the length of the proximal end of the body to an entrance of the exit orifice of the body.

In another aspect, the invention features a swirl ring for a plasma torch that includes a plasma chamber defined by a nozzle and an electrode. The swirl ring can include a body having a proximal end and a distal end and an exterior surface and interior surface. The swirl ring can include an inner gas chamber formed within the body and defined at least in part by the interior surface of the body. A proximal inlet gas opening can provide a gas to the inner gas chamber and at least one distal outlet gas port can provide a gas from the inner gas chamber to the plasma chamber and generate a substantially swirling gas flow in the plasma chamber.

In yet another aspect, the invention features a swirl ring for a plasma torch which is configured to mate within a portion of a vented nozzle. The swirl ring can include a body, where an interior surface of the body defines at least a portion of an inner gas chamber. The swirl ring can also include at least one outlet gas port in fluid communication with the inner gas chamber. The at least one outlet gas port can provide a swirling plasma gas by at least one outlet gas port during operation of the torch. The swirl ring can also include an exterior surface of the body that defines a portion of a venting channel for vented plasma gas during operation of the torch.

In yet another aspect, the invention features a plasma arc torch can include an electrode having a distal end face, a proximal end and an exterior surface. The torch can include a nozzle having an outer component, an inner component disposed within the outer component, and at least one plasma gas vent passage formed in the outer component. The torch can also include a plasma chamber defined at least in part by the distal end face of the electrode and the nozzle. A swirl ring of the torch can have an exterior surface, an interior surface and at least one swirl hole at a distal end and in fluid communication with the plasma chamber. An inner gas chamber can be defined at least in part by the interior surface of the swirl ring and the exterior surface of the electrode. The torch can include a venting channel that directs a plasma gas to the at least one plasma gas vent passage of the nozzle. A first portion of the venting channel can be defined at least in part by an interior surface of the outer component of the nozzle relative to the exterior surface of the swirl ring. A second portion of the venting channel can be defined at least in part by the interior surface of the outer component of the nozzle and an exterior surface of the inner component of the nozzle.

In yet another aspect, the invention features a method of forming a gas chamber within a swirl ring of a plasma arc torch. The method can include providing an electrode having a body with an exterior surface and inserting the electrode into a body of the swirl ring, the swirl ring body defining an interior surface, thereby forming the gas chamber within the swirl ring defined at least in part by the interior surface of the swirl ring and exterior surface of the electrode.

In other examples, any of the aspects above, or any apparatus or method described herein, can include one or more of the following features.

In some embodiments, the nozzle includes a cavity defined at least in part by the inner surface of the body and at least in part by the liner of the nozzle. The cavity can extend from the proximal end of the body to a feature of the liner. In some embodiments, the feature is a shoulder protruding from an inner surface of the liner. In some embodiments, the cavity is adjacent the inlet of the at least one vent passage formed in the body. The cavity can be dimensioned to receive at least a portion of a swirl ring for a plasma arc torch.

The nozzle can also include a gas vent channel directing a vent gas to at least one vent passage. In some embodiments, the liner of the nozzle defines a first portion of the gas vent channel relative to the body of the nozzle and a swirl ring defines a second portion of the gas vent channel relative to the body of the nozzle. In some embodiments, the at least one vent passage is a vent hole.

The cavity of a nozzle can have a first end corresponding to the proximal end of the body and a second end corresponding to a feature of the liner, where the second end of the cavity is nearer the exit orifice of the body than the proximal end of the body. In some embodiments, the feature of the liner can be a shoulder protruding from an inner surface of the liner. The cavity can be dimensioned to receive at least a portion of a swirl ring for a plasma arc torch.

In some embodiments, at least one plasma gas vent hole is disposed between the proximal end of a body of the nozzle and the proximal end of a liner of a nozzle.

A swirl ring can have a body with an interior surface that has an annular shape. A swirl ring can have a body sized to receive an electrode having an exterior surface. A protruding portion of an interior surface of the body can be sized to receive an electrode. The exterior surface of the electrode, in combination with the interior surface of the body, can form, at least in part, a portion of the inner gas chamber. An exterior surface of the body can form, at least in part, a portion of a venting plasma gas channel. A swirl ring can have a proximal inlet gas opening that extends from an exterior surface of the body to the inner gas chamber.

In some embodiments, a body of the swirl ring can include a shoulder portion dimensioned to engage an adjacent consumable of a plasma arc torch (e.g., a nozzle as described herein). The body of the swirl ring can also include a reduced diameter portion that defines at least in part, a portion of a venting channel for vented plasma gas during operation of the torch. In some embodiments, an exterior surface of the swirl ring is adjacent at least one vent passage formed in a nozzle for a plasma arc torch. A venting channel can vent plasma gas away from the plasma arc. In some embodiments, plasma gas in the inner gas chamber of the swirl ring and the vented plasma gas in the venting channel flow in substantially opposite directions during torch operation. In some embodiments, the swirl ring for a plasma arc torch can include a proximal inlet gas opening that provides gas to the inner gas chamber of the swirl ring and a distal outlet gas port that generates a swirling gas.

In some embodiments, a first of the two sealing locations of an electrode is proximal to the second of the two sealing locations. The first sealing location can provide a liquid seal and the second sealing location can seal the electrode to an adjacent swirl ring. At least one of the sealing locations can include or can be dimensioned to receive an o-ring.

In some embodiments, a proximal exterior sealing location or distal exterior sealing location of the electrode includes or is dimensioned to receive an o-ring. The electrode and a swirl ring can together define an inner gas chamber. A distal exterior sealing location of an electrode can be disposed between the inner gas chamber and the end face of the electrode.

A torch can include a nozzle that has a proximal end and an orifice at a distal end. A distal end of the swirl ring can be disposed nearer the distal end of the nozzle than the proximal end of the nozzle. A first interior sealing surface and a second interior sealing surface of the swirl ring can be disposed between the swirl ring and an exterior surface of the electrode. The first interior sealing surface and second interior surface can define at least in part the inner gas chamber. In some embodiments, at least one plasma gas vent passage of the nozzle of a plasma arc torch is adjacent the venting channel. At least one swirl hole can direct a swirling gas toward a distal end face of the electrode.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
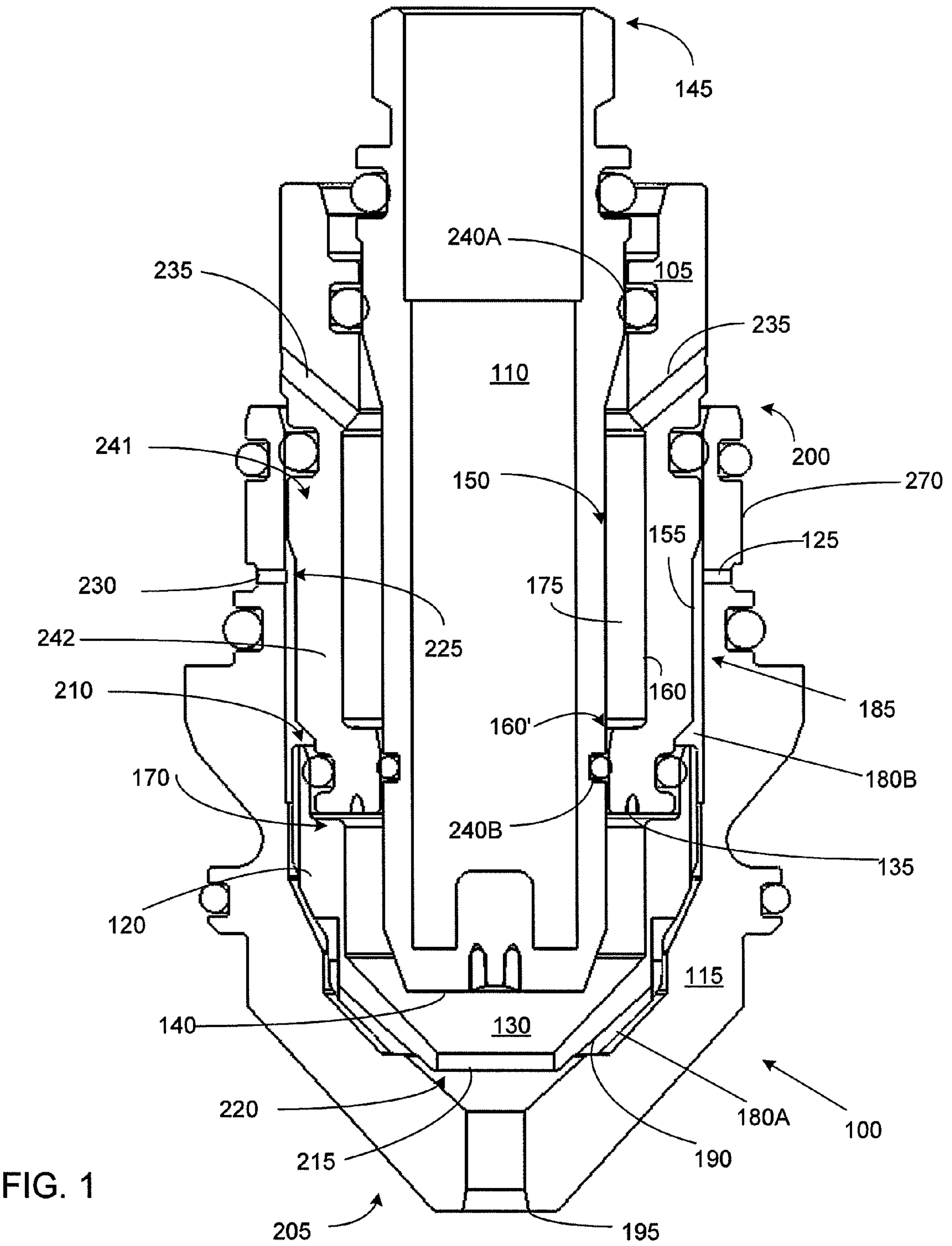
FIG. 1 shows a stackup of consumables of a plasma arc torch, according to an illustrative embodiment of the invention.

FIG. 1 shows a stackup of consumables of a plasma arc torch, according to an illustrative embodiment of the invention. A plasma arc torch can include a nozzle 100, swirl ring 105 and electrode 110. The nozzle 100 can include a body 115, a liner 120 disposed within the body 115, and at least one vent passage 125 (e.g., plasma gas vent passage) formed in the body 115. The nozzle 100 can be dimensioned to receive a swirl ring 105, which can be dimensioned to receive an electrode 110. The torch can include a plenum 130 defined, at least in part, by the swirl ring 105, electrode 110 and the nozzle 100. The nozzle 100 can be configured to mate with a swirl ring 105 so that a gas port 135 (e.g., swirl injection point) of the swirl ring 105 can be close to the electrode face 140. Such a configuration allows the use of both a vented nozzle to enhance nozzle life while also having a swirl hole (e.g., gas port 135, swirl injection point) that is close to an electrode face 140 (e.g., resulting in a reduced plenum 130) to enhance electrode life.

In some embodiments, the plasma arc torch includes a nozzle 100 having an outer component (e.g., body 115), an inner component (e.g., liner 120) disposed within the outer component, and at least one plasma gas vent passage 125 formed in the outer component. The torch can include an electrode 110 having a distal end face 140, a proximal end 145 and an exterior surface 150. The torch can include a plasma chamber (e.g., plenum 130) defined at least in part by the distal end face of the electrode 140 and the nozzle 100. In some embodiments, the torch includes a swirl ring 105 having an exterior surface 155, an interior surface 160 and at least one swirl hole (e.g., gas port 135) at a distal end 170 and in fluid communication with the plasma chamber. At least one swirl hole can direct a swirling gas toward a distal end face of the electrode 140. The interior surface of the swirl ring 160 and the exterior surface of the electrode 150 can define, at least in part, an inner gas chamber 175. The torch can also include a venting channel 180A and 180B that directs a plasma gas to the at least one plasma gas vent passage 125 of the nozzle 100. A plasma gas vent passage 125 of the nozzle 100 can be disposed adjacent the venting channel 180A and 180B. A first portion of the venting channel 180B can be defined at least in part by an interior surface of the outer component 185 of the nozzle 100 relative to the exterior surface of the swirl ring 155. A second portion of the venting channel 180A can be defined at least in part by the interior surface of the outer component 185 of the nozzle 100 and an exterior surface 190 of the inner component of the nozzle 100.

In some embodiments, the nozzle 100 is long and tapered (e.g., long and "pointy" vented nozzle) which can be advantageous for beveling applications. A long and tapered nozzle configuration can also be desirable so that at least one vent passage 125 (e.g., plasma gas vent passage) formed in the nozzle body 115 can be disposed further from the orifice 195 as compared to shorter nozzle designs. In shorter nozzle configurations, the vent passage can be closer to the orifice and, upon catastrophic failure, molten copper can enter into a vent passage and the torch vent line, causing failure of the torch (e.g., electrode blowout.) The body 115 of the nozzle 100 can have a proximal end 200 and an exit orifice 195 at a distal end 205. The liner 120 can include a proximal end 210 and an exit orifice 215 at a distal end 220 adjacent the exit orifice 195 of the body 115. At least one vent passage 125 in the nozzle can have an inlet 225 formed in the inner surface of the body 185 and an outlet 230 formed in the outer surface of the body 270. At least one vent passage 125 can be disposed between the proximal end of the body 200 and the proximal end of the liner 210. In some embodiments, a vent passage 125 is a vent hole.

The swirl ring 105 can include a body and an interior surface of the body 160 can define the inner gas chamber 175. In some embodiments, the interior surface 160 of the swirl ring can be annular shaped and the interior surface 160 can have a protruding portion 160' that can be sized to receive an electrode 110. An exterior surface 150 of the electrode 110, in combination with the interior surface of the body 160 of the swirl ring can form, at least in part, a portion of the inner gas chamber 175.

In some embodiments, a method of forming a gas chamber 175 within a swirl ring 105 of a plasma arc torch includes providing an electrode 110 having a body with an exterior surface 150 and inserting the electrode 110 into a body of the swirl ring 105, the swirl ring body defining an interior surface 160, thereby forming the gas chamber 175 within the swirl ring 105 defined at least in part by the interior surface 160 of the swirl ring 105 and exterior surface 150 of the electrode 110.

The swirl ring 105 can also include a proximal inlet gas opening 235 that provides a gas to the inner gas chamber 175. The proximal inlet gas opening 235 can extend from an exterior surface 155 of the body of the swirl ring 105 to the inner gas chamber 175. The swirl ring 105 can also include at least one distal outlet gas port 135 (e.g., swirl injection point, swirl hole, etc.) that is in fluid communication with the inner gas chamber 175 and provides a gas from the inner gas chamber 175 to the plasma chamber (e.g., plenum 130) and generates a substantially swirling gas flow in the plasma chamber. In some embodiments, the distal end of the swirl ring 170 is nearer the distal end of the nozzle 205 than the proximal end of the nozzle 200. In some embodiments, a first interior sealing surface 240A and a second interior sealing surface 240B is disposed between the swirl ring 105 and an exterior surface of the electrode 150. The first interior sealing point 240A and the second interior sealing point 240B can define at least in part the inner gas chamber 175. The first or second interior sealing point 240A and 240B can be disposed between the electrode 110 body and the swirl ring 105 inner diameter to prevent the plasma gas from leaking between the swirl ring inner diameter and the electrode body. In some embodiments, the swirl ring 105 can include a shoulder portion 241 and a reduced diameter portion 242. The shoulder portion 241 can be dimensioned to engage an adjacent consumable of the plasma arc torch (e.g., nozzle 100). The reduced diameter portion 242 of the swirl ring 105 can define, at least in part, a portion of the venting channel 180B for venting plasma gas during operation of the torch.

In some embodiments, the venting channel 180A and 180B is a gas vent channel that directs a vent gas to at least one vent passage 125 in the nozzle. In some embodiments, the liner of the nozzle 120 can define a first portion of the gas vent channel 180A relative to the body of the nozzle 115 and a swirl ring 105 can define a second portion of the gas vent channel 180B relative to the body of the nozzle 115. An exterior surface of the body of the swirl ring 155 can form, at least in part, a portion of a venting plasma gas channel 180B. An exterior surface of the swirl ring 155 can be adjacent at least one vent passage 125 formed in the nozzle 100.

Figure 2:
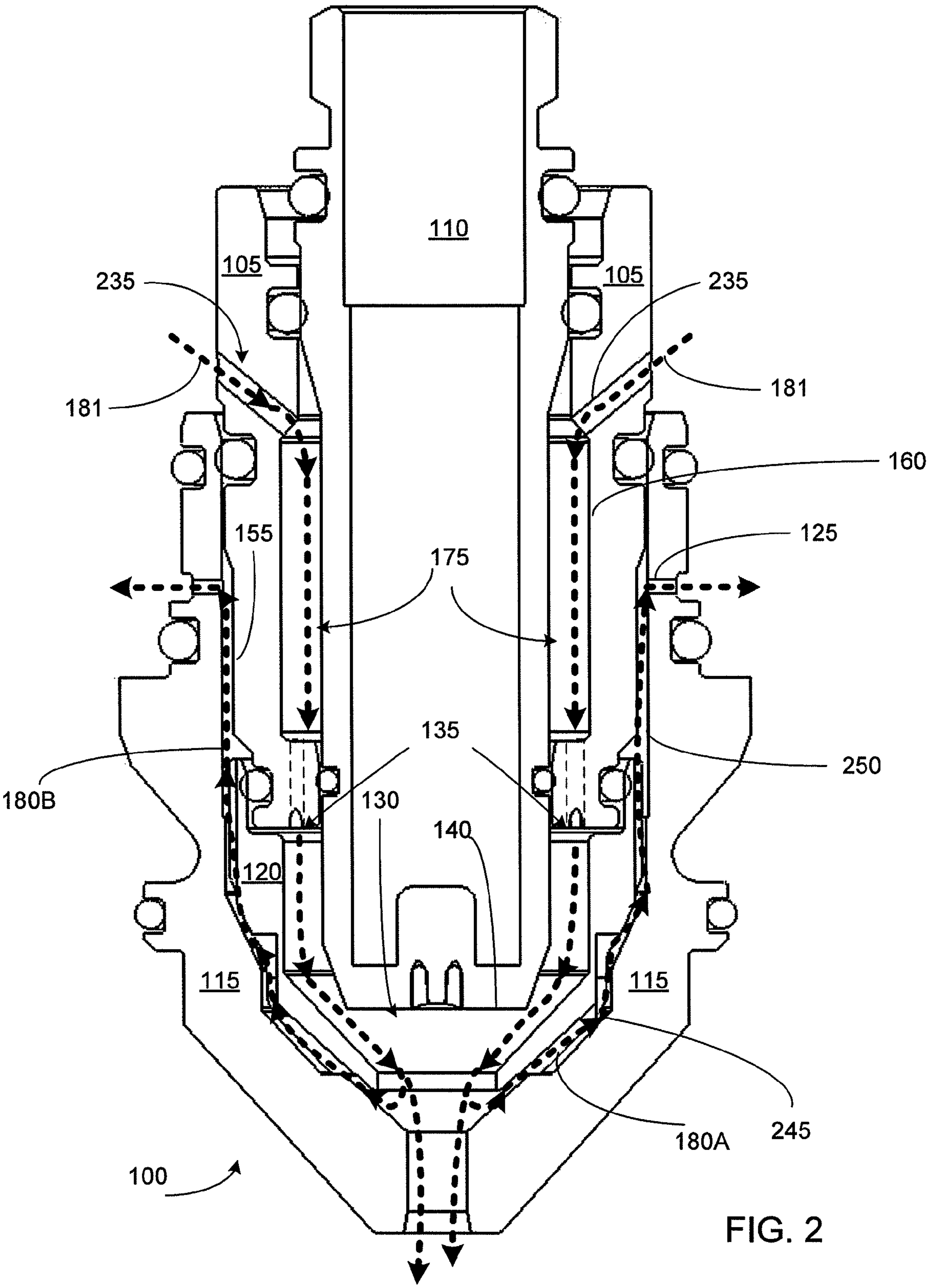
FIG. 2 shows a plasma gas flow path, according to an illustrative embodiment of the invention.

FIG. 2 shows a plasma gas flow path, according to an illustrative embodiment of the invention. Plasma gas flows from the torch through at least one proximal inlet gas opening 235 (e.g., metering or distribution holes) of a swirl ring 105 into the inner gas chamber 175. The plasma gas is directed to at least one distal outlet gas port 135 (e.g., swirl injection point, swirl hole, axial swirl injection holes, etc.) that provides a gas from the inner gas chamber 175 to the plasma chamber (e.g., plenum 130). The at least one distal outlet gas port 135 can be located near the electrode face 140, which can reduce emitter wear from the electrode 110 by preventing molten hafnium from being ejected during torch operation, thereby enhancing electrode life. A distal outlet gas port 135 can generate a substantially swirling gas flow in the plasma chamber. A portion of the plasma gas can be vented, directed through the venting channel 180A and 180B, cooling the nozzle 100, and directed to at least one vent gas passage 125 in the nozzle 100. As shown by the flow lines 181 in FIG. 2, an exterior surface of the swirl ring (e.g., exterior surface 155 of the body of the swirl ring) can guide the vented plasma gas (e.g., via a venting plasma gas channel 180B).

The vent flow can be first directed by a venting channel 180A or area between the liner 120 and the body of the nozzle 115. The vent flow can be directed between an outer diameter of a swirl ring 105 and an inner diameter of a nozzle body 115. In some embodiments, the vented gas can be directed through the venting channel 180A and 180B, passing between the liner 120 and the nozzle body 115 (e.g., nozzle shell) through several slots 245. The vented plasma gas can exit the slots and travel through an annular gap 250 (e.g., that defines a portion of the venting channel 180B) between the outer diameter of the swirl ring 105 and the inner diameter of the nozzle body 115 (e.g., shell). Then, the vented gas can pass through at least one gas vent passage 125 (e.g., metering holes, vent holes, etc.) to a torch vent gas conduit and out to ambient atmosphere.

Swirl ring 105 can be configured to mate within a portion of a vented nozzle 100. Swirl ring 105 can have plasma gas simultaneously flowing along an inner surface of the swirl ring body 160 and vented plasma gas flowing along an outer surface of the swirl ring body 155 during operation of the torch. The swirl ring 105 has a body and an interior surface 160 of the body can define a portion of an inner gas chamber 175 in fluid communication with at least one swirl hole (e.g., distal gas port 135 in FIGS. 1-2) which provides a swirling plasma gas during operation of the torch. An exterior surface of the body 155 of the swirl ring 105 can define a portion of a venting channel 180B for vented plasma gas during operation of the torch. As described above in FIG. 1, the body 115 and liner of the nozzle 120 can define another portion of the venting channel 180A. The venting channel 180A and 180B vents plasma gas away from the plasma arc. During torch operation, the plasma gas in the inner gas chamber 175 and the vented plasma gas in the venting channel 180A and 180B can flow in substantially opposite directions.

The design and placement of swirl rings within plasma arc torches can involve complex technologies and can impact torch operating characteristics. The design and placement of swirl rings can also impact the life expectancy of the consumable components (e.g., nozzle, electrodes, etc.). Placement of the swirl ring as described herein (e.g., FIGS. 1, 2, 3 and 4) can result in improved gas swirl flow control, extending the life of consumables (e.g., such as extending the life of the electrode by reducing emitter wear).

Figure 3:
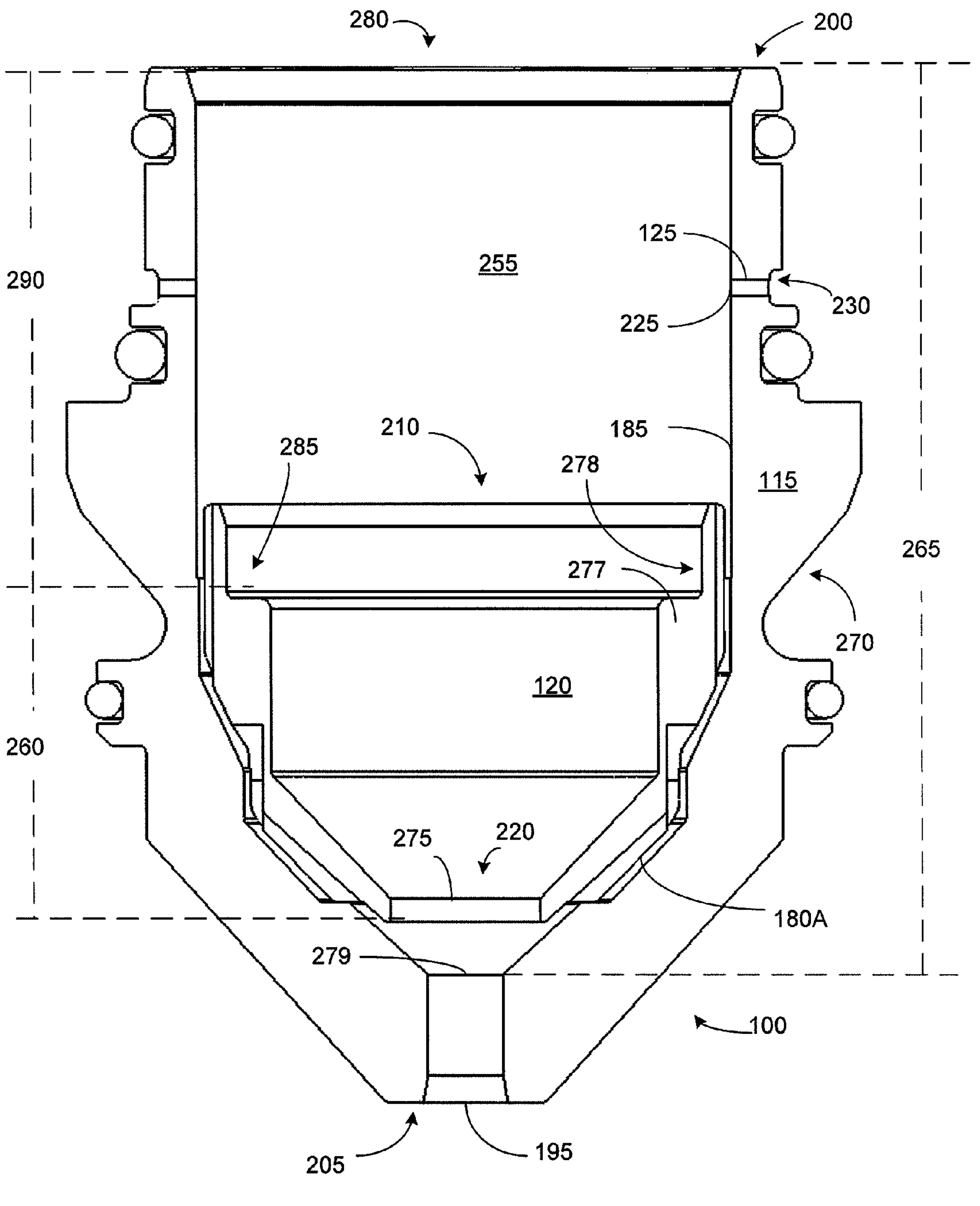
FIG. 3 shows a vented nozzle of a plasma arc torch, according to an illustrative embodiment of the invention.

FIG. 3 shows a vented nozzle of a plasma arc torch, according to an illustrative embodiment of the invention. The nozzle can include a body 115, a liner 120 disposed in the body 115, a vent passage formed in the body 125 and a plasma gas vent channel 180A. The nozzle can also include a cavity 255 dimensioned to receive at least a portion of a swirl ring (e.g., swirl ring 105 as described above in FIGS. 1 and 2) for a plasma arc torch. By reducing a length of the liner 260 as compared to the length of the body 265, the vent passage 125 (e.g., vent metering holes) formed in the body 115 can be exposed (e.g., not covered by liner 120). Such a configuration allows a swirl ring 105 to be extended deeper into the nozzle 100 as compared to a design where the liner covers or extends over the vent passage. By allowing a swirl ring 105 to extend deeper into the nozzle 100, a vented nozzle can be used to enhance nozzle life while simultaneously allowing a swirl injection point (e.g., distal gas port 135 shown in FIGS. 1 and 2) to be disposed close to an electrode face (e.g., resulting in a reduced plenum) to enhance electrode life.

The nozzle body 115 can have an inner surface 185, an outer surface 270, a proximal end 200, and an exit orifice 195 at a distal end 205. The nozzle 100 can also include a liner 120 surrounded by the inner surface of the body 185. The liner 120 can include a proximal end 210 and an exit orifice 275 at a distal end of the liner 220. The exit orifice of the liner 275 can be adjacent the exit orifice of the body 195.

In some embodiments, at least one vent passage 125 formed in the body 115 can have an inlet 225 formed in the inner surface of the body 185 and an outlet 230 formed in the outer surface of the body 270. A vent passage 125 can be formed in the body of the nozzle 115, but disposed in a region defined between the proximal end of the body 200 and the proximal end of the liner 210. The nozzle 100 can include a plasma gas vent channel 180A defined at least in part by a portion of the body 115 and the liner 120. The plasma gas vent channel 180A can be in fluid communication with and/or adjacent to the at least one vent passage 125 formed in the body of the nozzle 115. In some embodiments, a vent passage 125 is a vent hole.

The cavity 255 can be defined at least in part by the inner surface of the body 185 and at least in part by a portion of the liner 120 of the nozzle. In some embodiments, the liner 120 includes a feature 277 (e.g., any portion of the body of the liner 120, a feature protruding from an inner surface 278 of the liner, such as, by way of example, a contour, shoulder, flange, tapered surface, or step formed in the liner 120) thereby allowing the liner 120 to mate with at least a portion of a swirl ring (e.g., swirl ring 105 described in FIGS. 1-2). The inner surface 278 can establish longitudinal alignment of the swirl ring, thereby fixing its distance from the nozzle exit orifice 195. The cavity 255 can extend from the proximal end of the body 200 to the feature 277 (e.g., protruding feature) of the liner 120. In some embodiments, the cavity 255 is adjacent the inlet 225 of the at least one vent passage 125 formed in the body 115. The cavity 255 can also have a first end 280 corresponding to the proximal end of the body 200 and a second end 285 corresponding to the feature 277 of the liner. The length of the cavity 290 (e.g., the distance from the first end of the cavity 280 to the second end of the cavity 285) can be at least ⅓ the length of the body 265 (e.g., the distance from the proximal end 200 of the body to the entrance 279 of exit orifice of the body 195). In some embodiments, the second end of the cavity 285 is nearer the exit orifice of the body 195 than the proximal end of the body 200.

Figure 4:
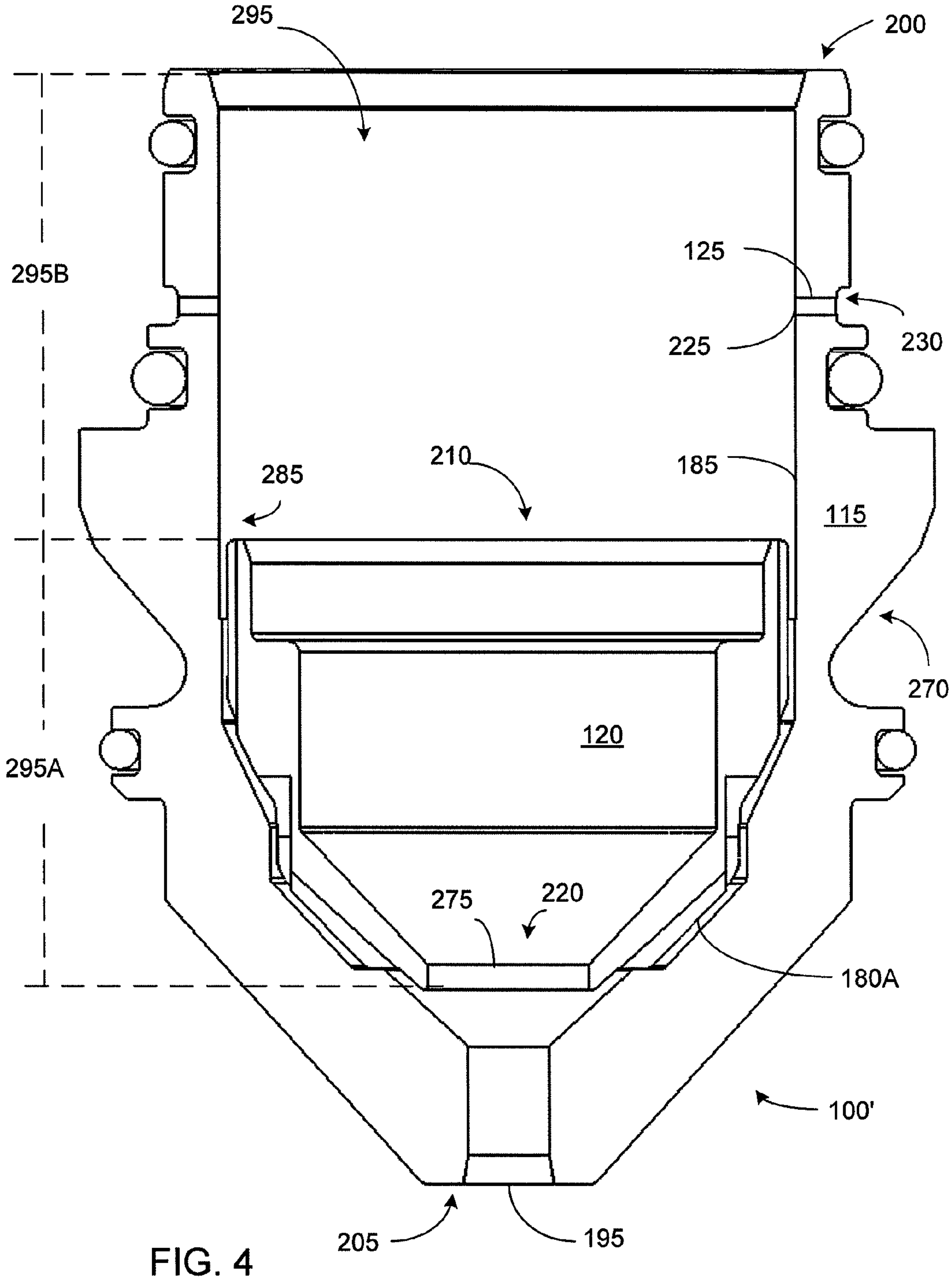
FIG. 4 shows a vented nozzle of a plasma arc torch, according to another illustrative embodiment of the invention.

FIG. 4 shows a vented nozzle 100' of a plasma arc torch, according to another illustrative embodiment of the invention. The nozzle 100 can include a body 115, a liner 120 disposed in the body 115, a vent passage 125 formed in the body 115 and a plasma gas vent channel 180A. The nozzle 100' can also include a void 295 (e.g., comprised of a first portion of the void 295A and a second portion of the void 295B) defined by the body 115 and dimensioned to receive the liner 120 and at least a portion of a swirl ring (e.g., swirl ring 105 as described in FIGS. 1-2) for a plasma arc torch.

The nozzle body 115 can have an interior surface 185 and an exterior surface 270, where the void 295 is defined by the interior surface 185 of the body 115. A liner 120 can be completely disposed within a first portion of the void 295A and adjacent the interior surface of the body 185. The nozzle 100' can also include at least one plasma gas vent hole (e.g., plasma gas vent passage 125) extending from the interior surface of the body 185 to the exterior surface of the body 270, where the at least one plasma gas vent hole is directly exposed to a second portion of the void 295B.

Figure 5:
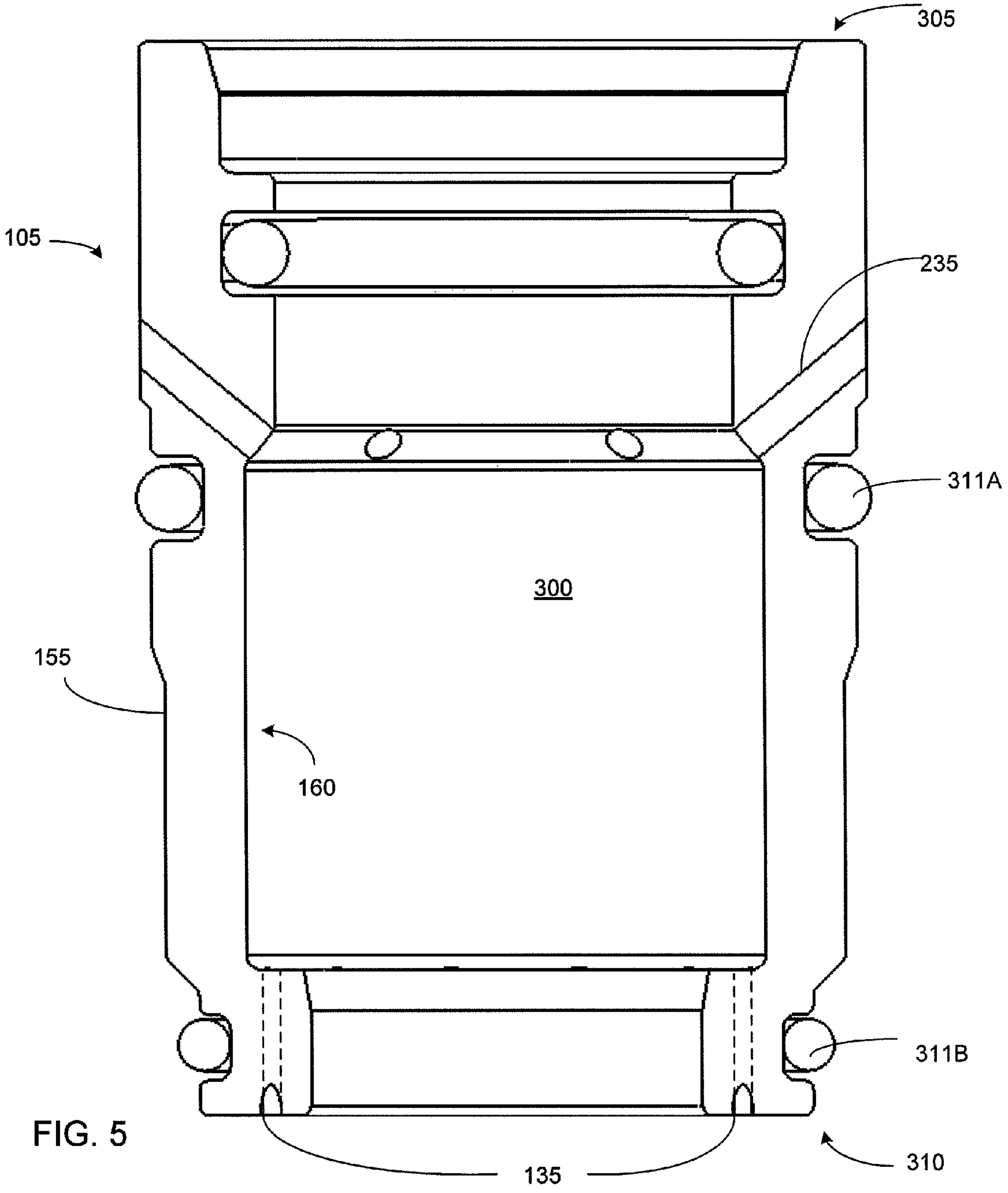
FIG. 5 shows a swirl ring of a plasma arc torch, according to an illustrative embodiment of the invention.

FIG. 5 shows a swirl ring 105 of a plasma arc torch, according to an illustrative embodiment of the invention. The swirl ring can define a plasma chamber defined by a nozzle (e.g., nozzle 100 as described above in FIGS. 1-2) and an electrode (e.g., electrode 110 as described in FIGS. 1-2). The swirl ring 105 can include a body 300 having a proximal end 305 and a distal end 310 and an exterior surface 155 and interior surface 160. The swirl ring can also include an inner gas chamber (not fully shown) formed within the body 300 and defined at least in part by the interior surface of the body 160. A proximal inlet gas opening 235 can provide a gas to the inner gas chamber. At least one distal outlet gas port 135 can provide a gas from the inner gas chamber to the plasma chamber and generate a substantially swirling gas flow in the plasma chamber. The proximal inlet gas opening 235 can extend from an exterior surface of the body of the swirl ring 155 to the inner gas chamber defined at least in part by the interior surface 160. The exterior surface 155 of the swirl ring 105 can be configured to direct a plasma vent gas between sealing assemblies 311A and 311B (e.g., which can include an o-ring or dimensioned to receive an o-ring, etc.) The sealing assemblies 311A and 311B can have different dimensions. In some embodiments, sealing assembly 311A can include an o-ring that is larger (e.g., greater diameter) than sealing assembly 311B. In some embodiments, sealing assembly 311A and 311B are dimensioned so that sealing assemblies 311A and 311B only engages for a short engagement distance, enabling ease of installation of the swirl ring 105 relative to the nozzle (e.g., nozzle 100 of FIGS. 1-4).

Figure 6:
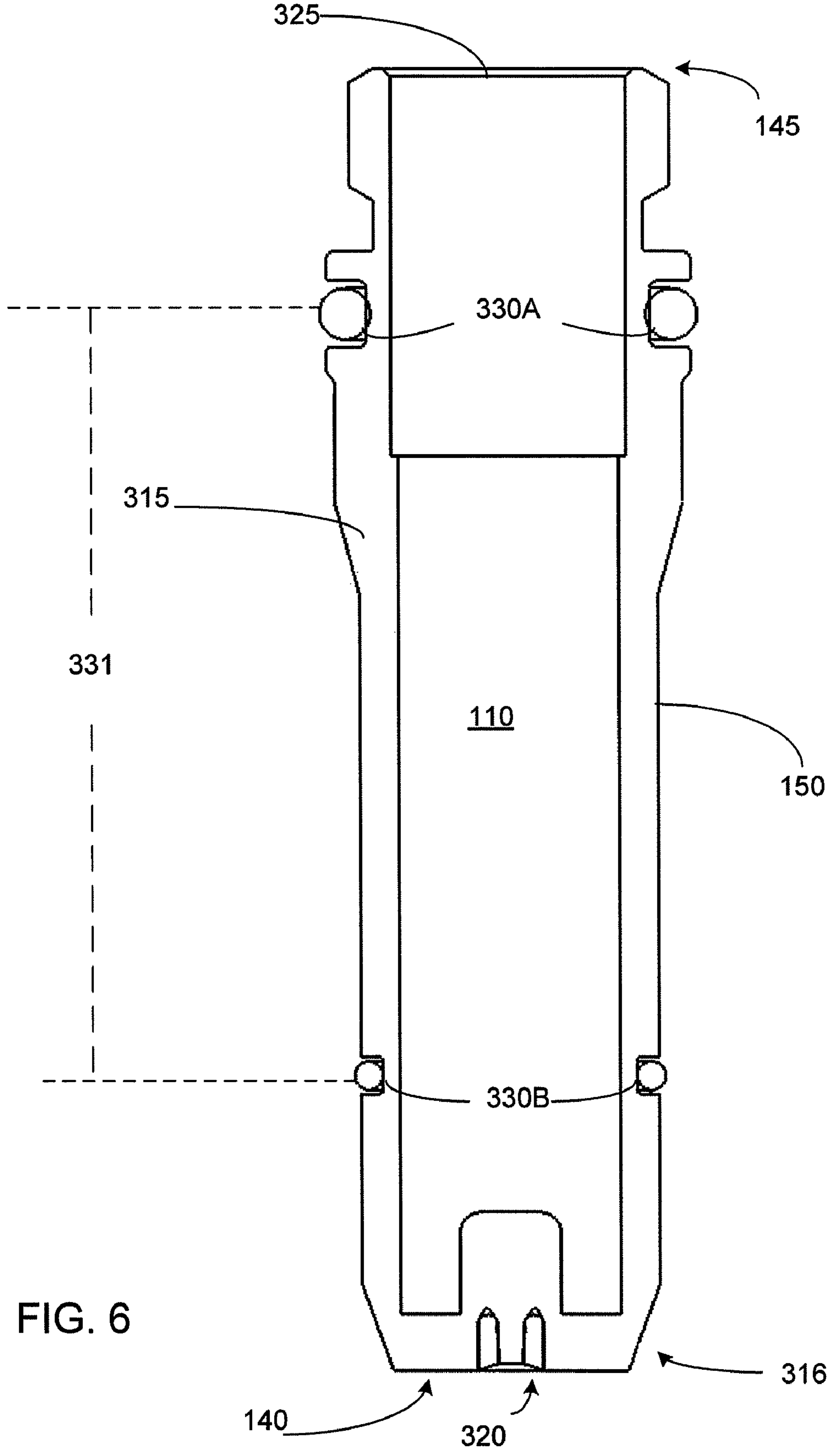
FIG. 6 shows an electrode of a plasma arc torch, according to an illustrative embodiment of the invention.

FIG. 6 shows an electrode 110 of a plasma arc torch, according to an illustrative embodiment of the invention. The electrode 110 can include an elongated body 315 that includes a proximal end 145 and a distal end 316. The electrode 110 can include an emissive element 320 at a distal end face 140. In some embodiments, the electrode 110 includes an opening at the proximal end 325. The electrode 110 can also include an exterior surface of the elongated body 150 having two sealing locations 330A and 330B that define at least a portion of an inner gas chamber relative to a swirl ring (e.g., swirl ring 105 as described above in FIGS. 1-2 and 5). The inner gas chamber (e.g., inner gas chamber 175 as described above in FIGS. 1-2) can be fluidly connected to at least one gas swirl hole (e.g., distal gas port 135 as described above in FIGS. 1-2 and 5) of the swirl ring. A portion of an outer surface 331 of the electrode 110 defined by sealing locations 330A and 330B can define an inner gas chamber (e.g., inner gas chamber 175 shown in FIGS. 1-2) relative to a swirl ring (e.g., swirl ring 105 above in FIGS. 1-2 and 5) and be configured to supply plasma gas to outlet gas ports (e.g., distal gas ports 135 in FIGS. 1-2 and 5).

In some embodiments, a first of the two sealing locations 330A is proximal (e.g., proximal exterior sealing location) to the second sealing location 330B (e.g., distal exterior sealing location). The first sealing location 330A can provide a liquid seal and the second sealing location 330B can seal the electrode 110 to an adjacent swirl ring (e.g., swirl ring 105 as described above in FIGS. 1-2 and 5). At least one of the sealing locations 330A or 330B can include or can be dimensioned to receive an o-ring. The second sealing location 330B can be configured to direct the plasma gas through at least one swirl hole of a swirl ring (e.g., distal gas port 135 as describe above) and towards the end face of the electrode 140. In some embodiments, the electrode 110 and a swirl ring (e.g., swirl ring 105 as describe above) together define an inner gas chamber (e.g., inner gas chamber 175 as described above) and the distal exterior sealing location 330B is disposed between the inner gas chamber and the end face of the electrode 140.

Figure 7:
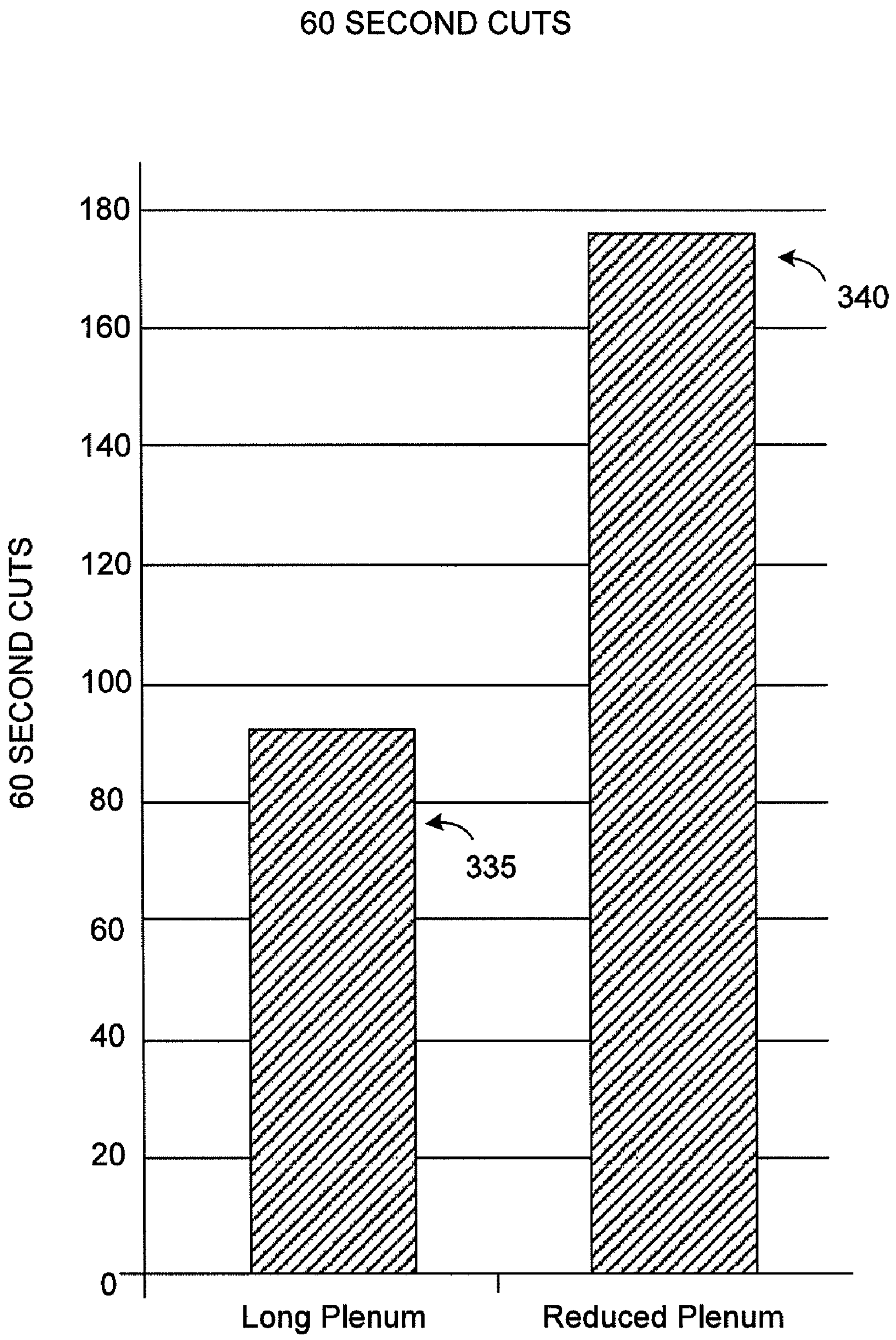
FIG. 7 shows test results of consumable life for a plasma arc torch.

FIG. 7 shows test results of consumable life for a plasma arc torch. The graph shows the results of 60 second cuts for a plasma arc torch having a long plenum 335 and a plasma arc torch having a reduced plenum 340. A plasma arc torch having a long plenum 335 yielded approximately 90 arc minutes. A plasma arc torch having a reduced plenum 340 yielded approximately 170 arc minutes. Therefore, it was discovered that a plasma arc torch having a reduced plenum—axial swirl injection design in a vented plasma process yielded the most arc minutes. It is also desirable to incorporate a long tapered nozzle (e.g., pointy nozzle) to satisfy bevel requirements. Increasing the distance from the exit orifice of the nozzle to the vent passage in the vented nozzle substantially reduces the possibility of molten metal entering the vent passage which can result in failure of the torch.

The term "cavity" and "void" as described herein (e.g., in FIGS. 3 and 4) can be interchangeable as used herein and have been used for clarity of description of the embodiments. While the invention has been particularly shown and described with reference to specific illustrative embodiments, it should be understood that various changes in form and detail may be made without departing from the spirit and scope of the invention.

What is claimed is:

1. A nozzle for a plasma torch comprising:

a body having an inner surface, an outer surface, a proximal end, and an exit orifice at a distal end;

a liner surrounded by the inner surface of the body including a proximal end and an exit orifice at a distal end adjacent the exit orifice of the body; and at least one vent passage formed in the body and having an inlet formed in the inner surface of the body and an outlet formed in the outer surface of the body, the at least one vent passage disposed between the proximal end of the body and the proximal end of the liner.

2. The nozzle of claim 1 further comprising a cavity defined at least in part by the inner surface of the body and extending from the proximal end of the body to a feature of the liner.

3. The nozzle of claim 2 wherein the feature of the liner is a shoulder protruding from an inner surface of the liner.

4. The nozzle of claim 2 wherein the cavity is adjacent the inlet of the at least one vent passage formed in the body.

5. The nozzle of claim 2 wherein the cavity is dimensioned to receive at least a portion of a swirl ring for a plasma arc torch.

6. The nozzle of claim 1 wherein the at least one vent passage is a vent hole.

7. The nozzle of claim 1 further comprising a gas vent channel directing a vent gas to the at least one vent passage wherein the liner of the nozzle defines a first portion of the gas vent channel relative to the body of the nozzle and a swirl ring defines a second portion of the gas vent channel relative to the body of the nozzle.

8. A nozzle for a plasma torch comprising:

a body having an interior surface, an exterior surface, and a void defined by the interior surface of the body;

a liner completely disposed within a first portion of the void and adjacent the interior surface of the body; and at least one plasma gas vent hole extending from the interior surface of the body to the exterior surface of the body, wherein the at least one plasma gas vent hole is directly exposed to a second portion of the void, the at least one vent hole disposed between the proximal end of the body and the proximal end of the liner.

9. A nozzle for a plasma torch comprising:

a body having a proximal end, a distal end and an exit orifice disposed at the distal end;

a liner having a proximal end, a distal end and an exit orifice disposed at the distal end of the liner and adjacent the exit orifice of the body;

a plasma gas vent channel defined at least in part by a portion of the body and the liner;

at least one plasma gas vent hole formed in the body, the at least one vent hole disposed between the proximal end of the body and the proximal end of the liner; and a cavity having a first end corresponding to the proximal end of the body and a second end corresponding to a feature of the liner, wherein the length of the first end of the cavity to the second end of the cavity is at least ⅓ the length of the proximal end of the body to an entrance of the exit orifice of the body.

10. The nozzle of claim 9 wherein the feature of the liner is a shoulder protruding from an inner surface of the liner.

11. The nozzle of claim 9 wherein the second end of the cavity is nearer the exit orifice of the body than the proximal end of the body.

12. The nozzle of claim 9 wherein the at least one plasma gas vent hole is disposed between the proximal end of the body and the proximal end of the liner.

13. The nozzle of claim 9 wherein the cavity is dimensioned to receive at least a portion of a swirl ring for a plasma arc torch.

14. A swirl ring for a plasma torch that includes a plasma chamber defined by a nozzle and an electrode, the swirl ring comprising:

a body having a proximal end and a distal end and an exterior surface and interior surface;

an inner gas chamber formed within the body and defined at least in part by the interior surface of the body;

a proximal inlet gas opening that provides a gas to the inner gas chamber; and at least one distal outlet gas port that provides a gas from the inner gas chamber to the plasma chamber and generates a substantially swirling gas flow in the plasma chamber.

15. The swirl ring of claim 14 wherein the interior surface of the body is annular shaped.

16. The swirl ring of claim 14 wherein the a protruding portion of the interior surface of the body is sized to receive an electrode, an exterior surface of the electrode in combination with the interior surface of the body, forming, at least in part, a portion of the inner gas chamber.

17. The swirl ring of claim 14 wherein the exterior surface of the body forms, at least in part, a portion of a venting plasma gas channel.

18. The swirl ring of claim 14 wherein the proximal inlet gas opening extends from an exterior surface of the body to the inner gas chamber.

19. A swirl ring for a plasma torch, the swirl ring configured to mate within a portion of a vented nozzle, the swirl ring comprising:

a body;

an interior surface of the body defining at least a portion of an inner gas chamber;

at least one outlet gas port in fluid communication with the inner gas chamber, wherein the at least one outlet gas port provides a swirling plasma gas during operation of the torch; and an exterior surface of the body defining a portion of a venting channel for vented plasma gas during operation of the torch.

20. The swirl ring of claim 19 wherein the body has a shoulder portion dimensioned to engage an adjacent consumable of the plasma arc torch.

21. The swirl ring of claim 20 wherein the body has a reduced diameter portion that defines, at least in part, a portion of a venting channel for vented plasma gas during operation of the torch.

22. The swirl ring of claim 19 wherein the exterior surface of the swirl ring is adjacent at least one vent passage formed in a nozzle for a plasma arc torch.

23. The swirl ring of claim 19 wherein the venting channel vents plasma gas away from the plasma arc.

24. The swirl ring of claim 19, wherein the plasma gas in the inner gas chamber and the vented plasma gas in the venting channel flow in substantially opposite directions during torch operation.

25. The swirl ring of claim 19 further comprising:

a proximal inlet gas opening that provides gas to the inner gas chamber; and a distal outlet gas port that generates a swirling gas.

26. A plasma arc torch comprising:

an electrode having a distal end face, a proximal end and an exterior surface;

a nozzle having an outer component, an inner component disposed within the outer component, and at least one plasma gas vent passage formed in the outer component;

a plasma chamber defined at least in part by the distal end face of the electrode and the nozzle;

a swirl ring having an exterior surface, an interior surface and at least one swirl hole at a distal end and in fluid communication with the plasma chamber;

an inner gas chamber defined at least in part by the interior surface of the swirl ring and the exterior surface of the electrode; and a venting channel that directs a plasma gas to the at least one plasma gas vent passage of the nozzle, a first portion of the venting channel defined at least in part by an interior surface of the outer component of the nozzle relative to the exterior surface of the swirl ring and a second portion of the venting channel defined at least in part by the interior surface of the outer component of the nozzle and an exterior surface of the inner component of the nozzle.

27. The torch of claim 26 wherein nozzle has a proximal end and an orifice at a distal end, the distal end of the swirl ring nearer the distal end of the nozzle than the proximal end of the nozzle.

28. The torch of claim 26 wherein a first interior sealing surface and a second interior sealing surface is disposed between the swirl ring and an exterior surface of the electrode and defines at least in part the inner gas chamber.

29. The torch of claim 26 wherein the at least one plasma gas vent passage of the nozzle is adjacent the venting channel.

30. The torch of claim 26 wherein the at least one swirl hole directs a swirling gas toward a distal end face of the electrode.

31. A method of forming a gas chamber within a swirl ring of a plasma arc torch comprising:

providing an electrode having a body with an exterior surface; and inserting the electrode into a body of the swirl ring, the swirl ring body defining an interior surface, thereby forming the gas chamber within the swirl ring defined at least in part by the interior surface of the swirl ring and exterior surface of the electrode.

* * * * *